United States Patent [19]
Haas

[11] Patent Number: 4,779,120
[45] Date of Patent: * Oct. 18, 1988

[54] LIGHT SENSITIVE VALIDATING IDENTIFICATION BADGE SYSTEM

[76] Inventor: David J. Haas, 9 Margret Ann La., Suffern, N.Y. 10901

[*] Notice: The portion of the term of this patent subsequent to Sep. 24, 2002 has been disclaimed.

[21] Appl. No.: 774,343

[22] Filed: Sep. 10, 1985

Related U.S. Application Data

[63] Continuation of Ser. No. 576,017, Feb. 1, 1984, Pat. No. 4,542,982, which is a continuation of Ser. No. 199,672, Oct. 21, 1980, Pat. No. 4,432,630.

[51] Int. Cl.⁴ .................. G03B 17/24; G03B 27/52
[52] U.S. Cl. ........................ 355/40; 355/133; 354/107; 40/1.5; 40/1.6; 368/327; 428/913
[58] Field of Search ............ 354/75, 76, 77, 78, 354/100, 105, 106, 107, 108, 109; 355/1, 20, 32, 39, 40, 43, 67, 69, 71, 77, 133; 40/1.5, 1.6, 625; 116/206, 308; 283/72, 81, 85, 87-91, 94; 368/89, 97, 327; 430/10, 17, 18, 512; 428/913

[56] References Cited

U.S. PATENT DOCUMENTS

| | | | |
|---|---|---|---|
| 2,602,369 | 7/1952 | Tuttle | 354/107 |
| 3,610,120 | 10/1971 | Morse et al. | 354/75 |
| 3,628,430 | 12/1971 | Morse | 355/43 |
| 3,779,651 | 12/1973 | Gunlock | 428/913 |
| 3,783,763 | 1/1974 | Whitley et al. | 354/108 |
| 3,797,025 | 3/1974 | Murphy et al. | 354/107 |
| 3,802,101 | 4/1974 | Scantlin | 283/1 |
| 3,906,523 | 9/1975 | Ogiso et al. | 354/109 |
| 4,026,642 | 5/1977 | Tanaka et al. | 355/20 |
| 4,141,642 | 2/1979 | Nagai et al. | 355/1 |
| 4,151,666 | 5/1979 | Raphael et al. | 283/91 |
| 4,153,365 | 5/1979 | English et al. | 354/108 |
| 4,191,962 | 3/1980 | Sramek | 354/105 |
| 4,192,606 | 3/1980 | Lewis | 355/40 |
| 4,222,662 | 9/1980 | Kruegle | 355/40 |
| 4,248,510 | 2/1981 | Baker et al. | 354/109 |
| 4,292,916 | 10/1981 | Bradley | 116/205 |

Primary Examiner—A. Mathews
Attorney, Agent, or Firm—Michael E. Zall

[57] ABSTRACT

A temporaty badge fabrication system is provided. The system comprises a badge for attachment to a wearer having at least one surface coated with an ambient light sensitive coating thereon which when exposed to ambient light conditions for a specified period of time changes to a specified color. An apparatus is further provided for printing information on the badge. The apparatus comprises a source of radiation and a printing mask facing the radiation source. The mask comprises an opaque portion and a radiation transmissive portion. The radiation transmissive portion contains an information portion. A badge holding means is disposed so that the mask is located between the radiation source and the badge holding means. A means is provided for activating the radiation source for a period of time sufficient to print the information on the badge in the specified color. Thus when the badge is exposed to ambient light for the specified period of time the badge changes to the specified color and the information is not discernible.

7 Claims, 3 Drawing Sheets

LIGHT SENSITIVE VALIDATING IDENTIFICATION BADGE SYSTEM

RELATED APPLICATION

This application is a continuing application of 06/576,017 filed 2/01/84, now U.S. Pat. No. 4,542,982, which is a continuing application of U.S. Ser. No. 06/199,672 filed on Oct. 21, 1980, now U.S. Pat. No. 4,432,630, the entire disclosures of which are incorporated herein by reference.

FIELD OF THE INVENTION

The present invention relates to a temporary identification badge system and, more particularly, to a badge system and a badge-fabrication means and method, that can employ a light-sensitive, coated badge blank with a stencil like printer.

BACKGROUND TO THE INVENTION

Identification badges have come into general use because of the need to discriminate between authorized persons and between employees and non-employees, as well as other groups. Improved security of a facility or a business is achieved when an effective identification badge system is empolyed. A recent survey of commercial card identification systems, whether photographic, visual, magnetic, electromagnetic, infrared, etc., illustrates the high security nature of many of these badge systems and their widespread application. However, the high security performance of each prior art badge system relies on the fact that each coded badge is assigned to one individual, and that the individual is uniquely linked to the badge itself by some physiological factor such as a photograph, finger print, hand geometry, signature, voice print, etc. When this physiological link is unavailable for use, the identification badge can be employed improperly, such as transferring the card from person to person, or admitting a person into excluded areas.

Where a physiological link is employed, the issuance of such a badge can be quite time consuming and suffer from other drawbacks, as well. Also, the determination of whether such a badge is valid or expired often requires close scrutiny, which is not always possible. Visitor badges and other temporary badges are a weak link in most security badge or card systems. This is because the individual is issued the badge for only a few hours or days, and the badge does not contain the physiological information of all other badges employed at the location. There is, in a temporary badge system normally no photograph of the visitor, nor his handprint. nor even his signature. Thus, a visitor badge may be used and re-used, improperly, by many different people and in most locations in a facility, including high security or confidential areas. This is because the temporary badge will be used by almost every type of person; salesman, serviceman, visiting scientist or engineer, advertising and marketing personel, accountants and auditing personel, etc.

As is widely known, temporary and visitor badges are frequently lost and/or forgotten to be returned. It is commonly experienced that frequent visitors may retain one of the visitor badges in order to bypass the time consuming check in procedures.

The present invention overcomes, or at least alleviates, these problems with prior art badges, by utilizing elapsed time indicating techniques, which rely on light exposure, an excellent method of indicating or measuring such time, provided the light intensity levels of the illuminated environments where the badge will be work, are relatively constant. This avoids transient and variable light effects on the badge which ean change the time characteristics of the badge. Because of the legal and operational requirements to provide adequate illumination in factory and other work facility, and good industrial engineering design for office buildings and businesses, a relatively constant illumination level generally does exist at facilities where temporary security badges will be employed. Thus, the elapsed time measuring means of the present invention, employed in the relatively constant illumination of this indoor environment is suitable for the physical stimulus required for these security badges. Alternately, outdoor illumination is also within reasonably close limits and an elapsed time indicating badge can be based at this illumination level.

SUMMARY OF THE INVENTION

The temporary badge fabrication system of the present invention generally comprises a printing device, light or radiation-sensitive coated badge blanks, and preferably means for attaching the finished badge to the wearer.

In the production of the badge, the light-sensitive badge blank is placed in the printing device by the issuer and a stencil-like imprint containing validating information is imparted to the badge blank by means of timed exposure from a radiation source, preferably a high intensity or concentrated spectral source that is preferably located inside the printing device.

The badge can then be attached to a transparent carrier that has pressure sensitive adhesive to hold it onto the clothing of the visitor or the badge may simply be inserted into a conventional plastic identification badge holder. During the time period of the visitor's stay in the facility, the badge is exposed to the substantially uniform level of ambient light, which causes the badge to change in character, thus changing or obliterating the validating information. The discolored or changed badge can then be discarded since it has been rendered invalid at the end of the day (or other predetermined time interval) since it is obvious to others that it is an expired badge.

PREFERRED EMBODIMENTS

Figure 1:
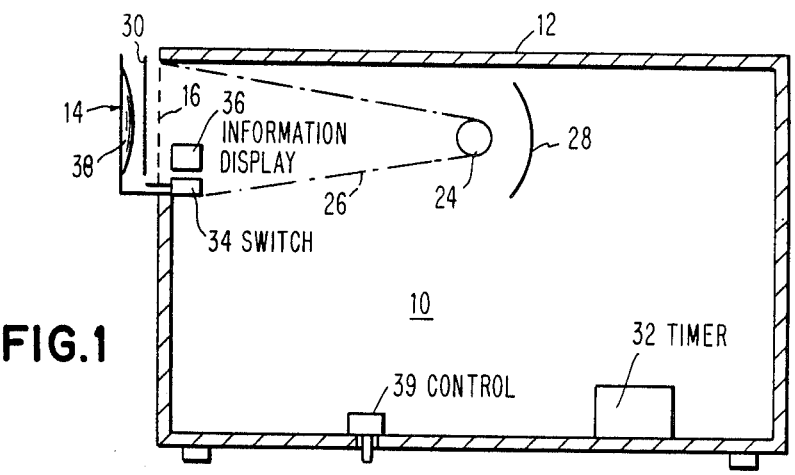
FIG. 1 is a transverse side elevation view of a first embodiment of the photo-stencil printer apparatus of the present invention.

Referring to FIG. 1, the badge printer 10, according to an embodiment of the present invention, comprises a housing 12 that contains a removable badge apparatus holder component 14, a removable stencil-like negative mask 16 (which can be transparent or translucent) containing the invarient information component 40 (FIG. 2) and optionally a variable information component 20 (FIG. 2), and a radiation source 24. The variable component 20 may be the time, date, serial number or other information. The housing 12 can be, and preferably is, made of radiation opaque material, e.g., plastic or metal, such that the strong radiation 26, like ultraviolet or visible light, for example, from the source 24 cannot escape to the outside. The radiation source 24 is preferably mounted with a reflector 28 to return the light, such that it passes through the transparent or translucent mask 16 onto the light sensitive badge blank 30 that is retained in position in the holder 14. The mask 16 can be of a stencil type, having a light opaque member with cut out areas embodying information or it can be of a photographic firm type or other suitable means.

The terms "radiation" and "light" will be used interchangeably in the description of the light source, since the light-sensitive badge blank can be designed to respond to radiations other than visible light.

Thus, infrared or ultraviolet radiation, for example may be employed in the present invention.

The light source 24 is preferably controlled by a timer 32 which is initiated by a switch 34 that conveniently can be located at the lower end of the badge holder 14, such that it is actuated by the insertion of the badge blank 30. The timer 32 provides a fixed or variable time exposure (FIG. 8) depending on whether the printer is a fixed exposure or time-compensated exposure to give fully void badges at the end of the day independent of the time of the badge was printed during the day. Variable time exposure systems require the stencil mask 16 to be translucent or partially optically dense but not fully opaque, to the stencil printing light 26.

The badge blank 30 slides inside the holder component 14 and is held proximate to or against the invariant information mask 16 and as depicted in FIG. 1, a variable information display 36 by means of a pressure pad 38. The bottom of the badge blank 30, upon its insertion, closes the switch 34 to initiate the exposure of the badge blank 30 through the mask 16 and the variable information display 36. The control 39 allows setting the variable display to the desired values as explained hereinafter and for adjusting the exposure timer 32.

The variable information display can optionally be a stencil alphanumeric set that is put in place daily in order to display and print the correct variable information of the badge. The information can be cut-out stencils or it can be information or intelligence printed on transparent or translucent supports that print validating invariant design 40 (FIG. 2), which invariant information can include, for example, the company name, the term "visitor" 21, etc.

Optionally, the variable portion of the mask may comprise a numerical gas discharge display, a mechanically rotating number stencil disk, a mechanically moving film negative containing a number or a variable numerical display. The variable numerical display, optionally, may be a counter to indicate a serial number and/or is controleld from a keyboard to indicate the a persons identification number.

Figure 2:
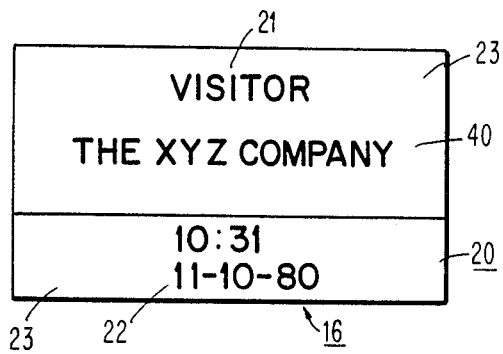
FIG. 2 is a front elevation view of the printing mask, or stencil, of the printer apparatus of FIG. 1, containing invarient badge information component and variable time-date information component.

FIG. 2 illustrates the stencil mask 16 containing the invariant printed information 40 and a time, a date, a serial issue number or combination 20 of variable information. The light passes through the transparent or translucent portions 21 and 22 of the mask 16 to print the variant and invariant information 21, 22 on the badge blank 30, but cannot pass thorugh the opaque portion 23 of the negative or mask 16, which provides a supporting structure.

The printing mask 16 (FIG. 2, may be a cut-out stencil, i.e., a thin support material with openings in the material to permit passage of the radiation to transmit to the badge blank 30 the inforamtion or intelligence of the mask or the mask 16 may be of a coated transparent or translucent material, like plastic or glass, to p.irnt in the same fashion as a photographic negative.

The variable display 36 (FIG. 1) is illuminated when the badge blank 30 closes switch 34 so that the variant information, such as, for example, actual time and date information 22 are recorded on the badge blank by the light. The illumination passing through the light permeable regions of the negative mask 16 provides the light energy to cause the light sensitive badge blank 30 to become darkened in those areas struck by the illumination.

Figure 3A:
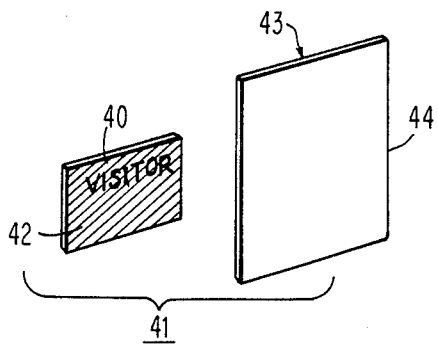
FIG. 3A is an exploded perspective view of the light sensitive badge produced according to the present invention and its carrier.
Figure 3B:
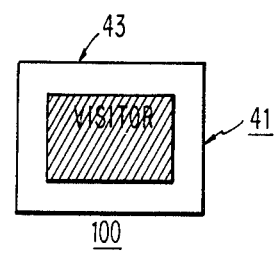
FIG. 3B is a front elevation view of the badge of FIG. 3A.

Printed valid badges produced according to this invention can be attached to the wearer by any of several means. The embodiment shown in FIGS. 3A and 3B comprises a two piece construction whereby the exposed light sensitive material face of the badge blank is applied to the adhesive 44 of a transparent or translucent badge holder 43. The transparent holder-adhesive combination (FIG. 3B) has the light sensitive side 42, which contains the printed information, attached to the holder 43 (which can be made of translucent or transparent plastic) on-the one side thereof having an adhesive. The light sensitive face 42 of the badge 41 can be seen through the holder 43 and is preferably smaller than 43 so that an adhesive border is located around the badge 41 to attach the assembly 100 to the wearer's clothing.

In producing the badge, the unexposed badge element 30 is exposed in the printer apparatus 10, validating it and then is attached to the carrying holder support 43. The carrying support 43 preferably is of transparent plastic which contains or is coated with light absorbing or filtering materials, such as e.g. 2 Hydroxy-4-Methoxybenzophenone, 2 Hydroxy-4-N Octoxybenzophenone, Ouinacidone Red, Titro-o-Toluidine, conventional red or yellow pigment, or other suitable materials. The support 43 is preferably coated on the back with pressure sensitive adhesive 44 such that the exposed badge component 41 can be attached, to the carrying member 43, which, in turn, can be larger than the information containing badge component 41 and has exposed adhesive for attachment to the clothing of the wearer.

Figure 4:
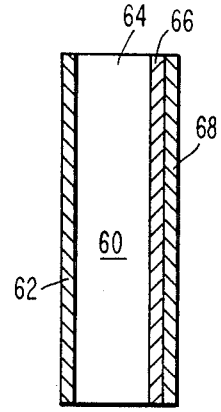
FIG. 4 is a sectional side elevation view of a composite single-piece light sensitive badge produced according to another embodiment of the present invention.

FIG. 4 illustrates a further preferred embodiment for a composite single piece badge 60. The badge 60 comprises a paper support member 64 with a light sensitive coating 66 on one side of the paper support member 64 or if desired, the light sensitive material may be incorporated into the paper. A further coating or layer 68 may be applied over the light senstive material 66 to filter a portion of the incident ambient light so as to adjust the rate of change to meet the requirements of the user. This coating 66 may be sufficiently insensitive to light so that no such light filtering element or component, is required such as 68. Such light absorbing or filtering material as specified in the above example are typical of the light absorbers that may be employed, although others may also be used.

Furthermore, several different badges with different light absorbing and/or photosensitive coatings or concentrations thereof may be employed to provide a variety of time rate of information changes, to achieve badges usable for different time periods. In addition, a presure sensitive adhesive 62 is applied to the backside of the paper 64 to permit the badge to be attached to the visitor's clothing directly.

Figure 5:
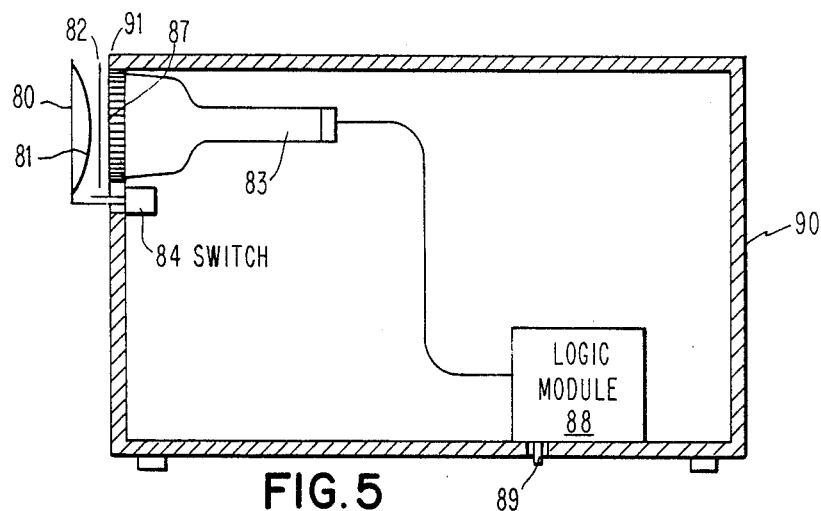
FIG. 5 is a sectional side elevation view of a printer apparatus according to a second embodiment and containing a cathode ray tube printer system.

FIG. 5 illustrates a further embodiment of a badge printer whereby all the exposure validating information 21, 22 (FIG. 2) is generated electronically by the cathode ray tube (CRT) 83 at its fiber optic coupling face 86, the fiber optic cathode ray tube 83 being located in a housing 90 with its fiber optic face plate 87 facing outward. A printed stencil design may be used on the front face 91 of the cathode ray tube 83 to impart information further to that generated by the cathode ray tube.

The information generated by the cathode ray tube comes from an electronic logic module 88 which contains fixed format validating information for the invarient part of the badge and a time, date, serial number, etc., generator for the variable part. The badge 82 is placed into a holder 80 which urges the badge 82 against the face 87 of the cathode ray tube 83 by means of a pressure plate 81. Printing is initiated by means of switch 84, triggered by the insertion of the badge blank into the holder 80, which then causes the illuminated information to be displayed and imparted to the badge blank.

The amount (i.e., time/or intensity) of exposure employed in the badge printing operation preferably increases as the day progresses, in order to make the badge equal in the level of contrast between the printed portions and the unprinted or background portions of the printed badge, to what it would be had the badge been exposed to the ambient light level, e.g., the commercial lighting, throughout the day. Thus, the contrast for all badges prepared up to a time on a certain day, for example, would at some point during the day, be approximately the same, so that, at the end of the day or other desired time interval, substantially all, if not all, of the badges prepared and issued during the designated time interval, would automatically be invalidated, due to the decrease or elimination of contrast in the badge elements, which is brought about by the ambient light.

To produce an exposure background on the unprinted badge background, the dark portion of the stencil not containing intelligence are not completely opaque to the printing radiation, but are partially opaque, translucent, or dense so that some percent, say 25% or 50%, for example, of the printing radiation is transmitted to the photosensitive badge blank through those portions. As integrated printing exposure increases, the light passing through the light transmitting portion of the stencil that contains the information saturates the photosensitive paper so that the background intensity begins to reduce the contrast differential and, thus, the badge approaches the void conditions, such that the badge is completely void at the end of the predetermined time span.

Figure 8:
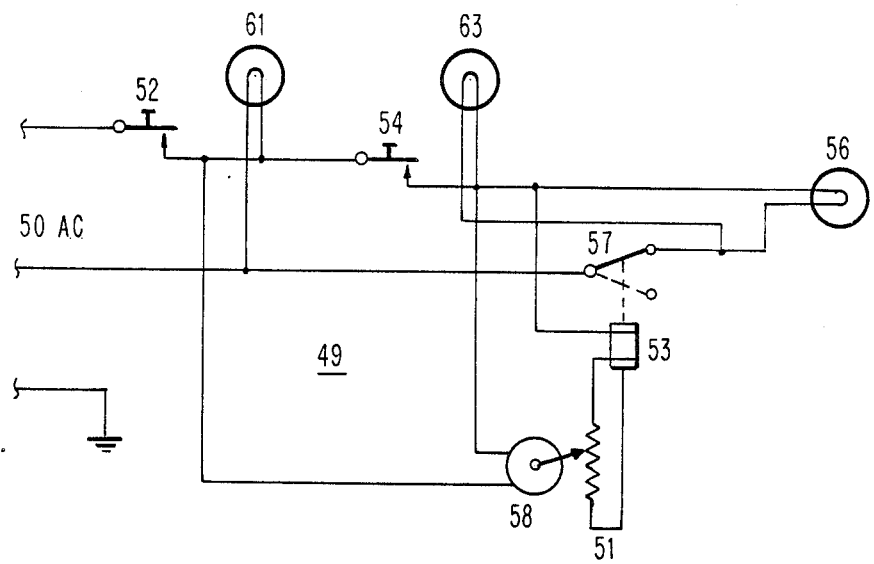
FIG. 8 is a schematic diagram showing an embodiment of the time compensation circuit for the badge printing apparatus.
Figure 9:
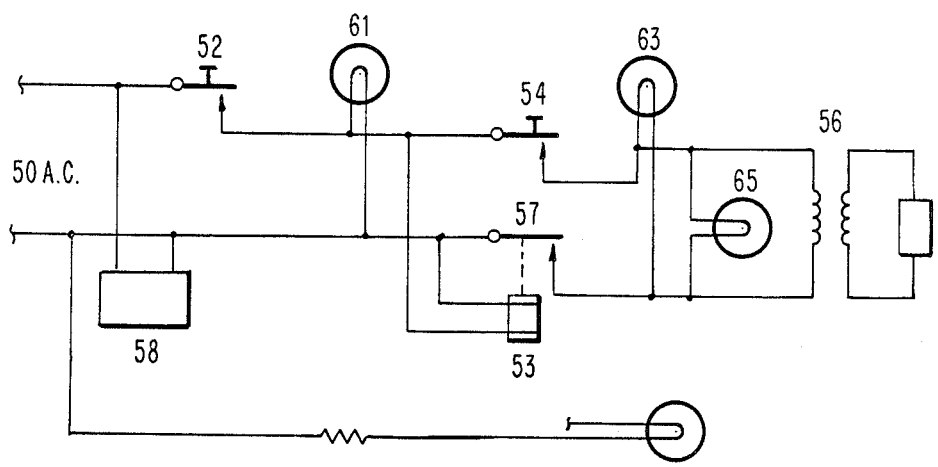
FIG. 9 is a schematic diagram showing an embodiment of an electrical circuit employable in the present invention.

FIG. 8 shows the electical schematic for the time compensated badge exposure system. As shown in FIG. 8, the printer operates as follows. In circuit 49 power is supplied to the printer by mains 50. A clock motor 58 is attached to a variable resistor 51 such that it goes from 0% to 100% of full value in a predetermined time span. The clock is set so that 0% resistance corresponds to the beginning of the business day, say 9 a.m. Time delay relay 53 uses the external resistor value 51 to change its RC circuit time base. Power switch 52 is turned to activate the system and the power on light 61. When a badge blank is inserted into the printer mechanism, it actuates switch 54 which causes the printer lamp 59 to illuminate. The print-in-progress lamp 63 illuminates to inform the operator that printing is taking place when the timer 53 times out, it energizes its relay contracts 57 so that the printing light extinguishes. The operator removes the printed card to be issued to the visitor.

As the day progresses, the resistor value 51 increases so that the printing time of timer 53 increases from say 1 to 10 seconds. This causes the printed badge background density to increase 10 times, e.g., the degree of contrast between the printed and unprinted portion of the badge, is lowered to a level which would correspond to the equivalent contrast that the badge would experience in an environment to a badge issued in an earlier time. Circuit 49 can be of a variety of forms, with a mercury florescent or incandescent printing lamp 59, analogue or electronic timers replacing the RC circuit timer 53, and stepped resistor switches, digital clock, or mechanical or electronic interval timer replacing the clock motor 58. All of the various substitute electrical components perform the same and function for the variable time printer, namely an increase integrated printing exposure to the badge as a function of the elapsed work day or work shift period for the business day when visitors are admissible to the facility.

In operation, the badge 40 or 60 is removed from a light tight storage box (not shown) and placed light sensitive face first, towards the light source 12, into the badge holder 26. When the badge is fully seated in the holder, the switch 34 is closed and the illuminating source 24 is turned on for a period of time determined by timer 32. The stencil like information 18 on the mask is transferred to the badge along with the time date information 22. The badge is then removed and prepared for attachment to the wearer. This is done by placing the badge 41 into the adhesive 62 of badge 60 to expose its pressure sensitive adhesive 62.

After the badge is placed on the wearer's clothing, ususally chest height and facing forward, it becomes exposed to the ambient light of the facility environment. Since most factories and office buildings have ambient florescent lighting in the range of 50 to 150 footcandles, the badge will change color or contrast due to light photon interaction with the light sensitive coating, in a period of several hours, provided the light sensitive material and the light absorbers have been selected to meet these conditions. At a result of the decrease or elimination of the contrast between the validating, or information (and even the invarient) information will not be discernible and it will be recognized, by looking at the badge, that is no longer valid.

The advantages of the invention are considerable and numerous. The printing negative mask can be photographically or photochemically etched so that high security detailed information can be reproduced by the badge printer. The mask can also be changed easily and frequently in order to maintain the integrity of the high security badge system. The variable information will provide an absolute date and time vector so that attempts to reuse the badge on another day will be easily thwarted. Additional alphnumeric information could be provided such as the day of the week and even the individual name. Futhermore, additional facilities in the badge printer itself may permit one's photographic image to be relayed and reproduced on the light sensitive badge itself. This image would provide an abolute physiological feature of the individual to whom the badge was issued. Such an image may be reproduced on the cathodery tube or could be directly imaged onto the badge blank by means of lenses and light amplifers, but this image, too, would be obliterated by the ambient light with the passage of time, thereby invalidating the badge.

The described badge system is a disposable elapsed time indicator so that it is visible apparent that the badge is void after the expiration of the desired time. The elapsed time indication is a function of ambient illumination which is relatively constant for a given facility. The printer can be employed with badges of different light sensitivity so that, for example, a badge issued half-way through the day may have twice the light sensitivity as a badge issued at the beginning of the day. The printer may thus have a time-compensated exposure device so that it prepares a properly exposed badge independent of the badge sensitivity or with a compensating light filter. Likewise, the printer may change its light exposure as the day progresses so that the badge is exposed more later in the day than in the morning. This will provide a badge with equal change by the end of the day to show its void condition no mater what time it is issued and printed.

Figure 6:
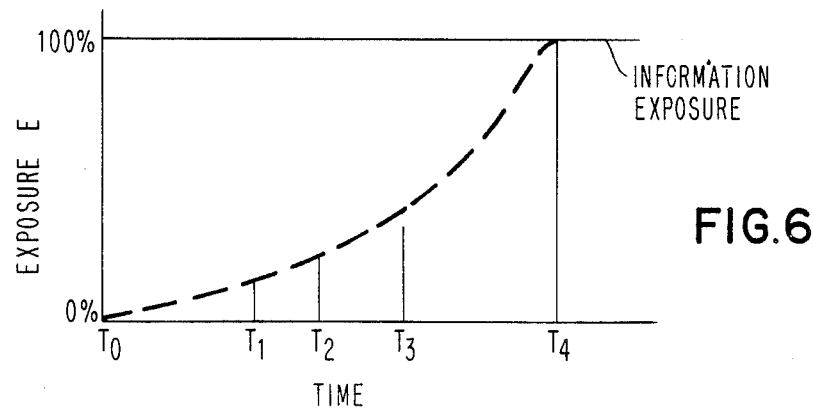
FIG. 6 is a graph depicting the change in the characteristics of a processed badge with the passage of time.

Referring to FIG. 6, there is graphically described the extent of exposure of the background field of a badge with the passage of time, under actual use conditions of an issued badge that is subjected to ambient light. It can be seen, in the case of an issued badge printed at the beginning, $T_0$, of a predetermined time period, that at time, $T_4$, which is the end of the time period, the background is fully exposed by the ambient light, so that the validating information is virtually indistinguishable from the background thereby rendering the badge invalid and useless. The darkening of the background at the various intermediate times $T_2$, $T_3$, and $T_4$ can be seen from FIG. 6. FIG. 6 can also represent the degree of exposure of the background of a badge that is being produced by imprinting thereon the validating information as previously described. Where the badge blank is being printed during the day the exposure of the badge background, or field, for a certain amount of time sufficient to darken the background to the point that it would be, had the badge been issued at the beginning of the day, causes the background and the validating information to be, at the end of the day. (or other predetermined period), $T_4$, virtually indistinguishable from each other, thereby invalidating the badge. Thus, if, for example, the badge is being issued at time, $T_3$, for the rest of the time period, to $T_4$, then the background of the badge (which can be exposed by exposing the entire printed badge) is exposed to lgiht sufficient to darken the badge to the level, E, where the badge would be had it been issued at the beginning, $T_0$, and exposed to ambient light for the time $T_0$-$T_3$. In this way the badge cannot be used beyond $T_4$, thereby enhancing the security.

Figure 7:
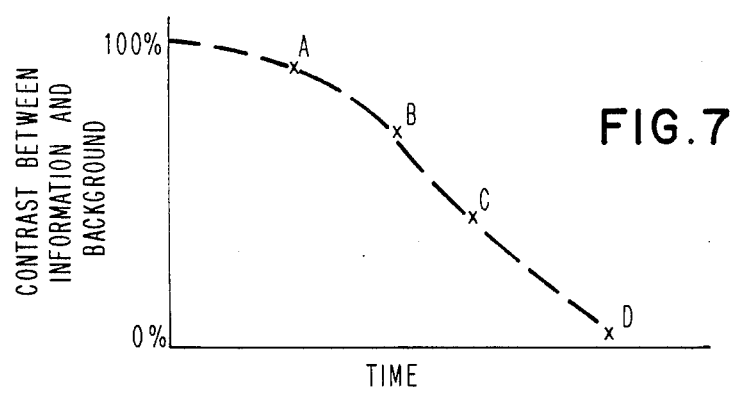
FIG. 7 is a graph depicting the change in contrast between printed portions and unprinted portions of an issued badge, with the passage of time.

Referring to FIG. 7, which graphically depicts the change in characteristics (i.e. the contrast between the printed information of a processed badge and its background) with the passage of time where, at time 0, there is a relatively large degree of contrast, considered to be 100% (an index of contrast) between the printed badge information and the badge background. As the time for the predetermined period for which the badge is issued, passes the badge is exposed more and more to the ambient light, so that, at time D, which is the end of the predetermined time period the badge is fully exposed and the printed information is indistinguishable from the background rendering the badge void. It can be seen that the obliteration of the printed information, which validates the badge, is gradual with the passage of time.

The radiation employed for printing the badge can be ultraviolet light, e.g., in about the range of 1800 to 4000 angstroms. The radiation range can be about 2200 to 4000, or about 3000 to 4000, or about 3200 to 4000 angstroms. One source of radiation is a continuously operating low pressure mercury vapor tube or a flash sensor discharge tube.

The invarient mask portion can be fused silica quartz, the information bearing parts of the mask being radiation transmissive.

The advantages and variations of the light dependent self invalidating security badge system are numerous. The badge printer can embody a more complex badge blank printing mechanism than the manual insertion and removal type which automatically enters and ejects the completed printed badge. Single blank badges can then be properly positioned behind the contact printing stencil and the printing time automatically controlled without operator intervention. Loading and unloading the badges behind the contact stencil while the printing lamp is on would cause ghost images to appear on the badge itself, so either a mechanical shutter device or an electrical system to turn off the printing lamps must be incorporated into the badge printer.

In order to facilitate rapid printing lamp turn on and turn off, the ultraviolet light source, one is required to employ low pressure discharge lamps like florescent lamps instead of the conventional high intensity high pressure mercury or halide discharge tube which require several minutes to warm up. Fluorescent lamps can be operated with a trigger start systems, with separate preheat filament transformers to provide instant starting florescent lamps so that no shutter is required, or with cold cathode ballasts type starting circuits so the fraction of the printing time (approximately 3–10 seconds) which is required for the lamp turn on time (approximately ½ to 3 seconds is small).

Furthermore, the printer may incorporate a design where the badges are not precut single badge blanks, but are continuous from a supply roll which are fed into the printing mechanism, printed, then cut by a mechanical blade into individual badges and ejected from the printer. This roll feed concept provides means for faster and more efficient printing of large quantities of badges. Also, there is no hand operation by the operator in loading the badge blanks into the printing mechanism which may result in creased or bent badges, or finger prints on the photosensitive surface of the blank, or exposure to the ambient light before printing.

What is claimed is:

1. A temporary security badge fabrication system comprising:
   a badge having at least one surface coated with an ambient light-sensitive coating which when exposed to ambient light conditions for a specified pre-determined period of time will change to a specified color;
   a filter coating applied over the ambient light-sensitive coating to filter a portion of the ambient light;
   a means for printing information on the badge, wherein the information includes time, date, serial number of badge or identification of person;
   attachment means mounted to the badge for attaching the badge to a wearer and permitting exposure of the badge to ambient light;
   whereby when the badge is attached to the wearer and exposed to ambient light for the specified period of time, the badge changes to the specified color.

2. The system of claim 1, wherein the information is controlled by a clock indicating time and date.

3. The system of claim 1, wherein the information includes an image of a person as seen by a television camera.

4. The system of claim 1, wherein the information includes the image of a person as stored in a digital memory device.

5. The system of claim 1, wherein the attachment means includes a paper support.

6. The system of claim 1, wherein the attachment means includes adhesive on a surface.

7. The system of claim 1, wherein the attachment means includes a transparent face, the information being viewed therethrough.

* * * * *